(12) United States Patent
Wang

(10) Patent No.: US 7,242,700 B2
(45) Date of Patent: Jul. 10, 2007

(54) STABILIZED FREQUENCY-CONVERTED LASER SYSTEM

(75) Inventor: Charles Xiaoyi Wang, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 185 days.

(21) Appl. No.: 10/958,935

(22) Filed: Oct. 5, 2004

(65) Prior Publication Data

US 2006/0072635 A1   Apr. 6, 2006

(51) Int. Cl.
*H01S 3/10* (2006.01)

(52) U.S. Cl. .......................................... 372/22; 372/21
(58) Field of Classification Search .................... 372/22
See application file for complete search history.

(56) References Cited

U.S. PATENT DOCUMENTS

| | | | | |
|---|---|---|---|---|
| 5,093,832 A | | 3/1992 | Bethune et al. ................ 372/21 |
| 5,216,681 A | * | 6/1993 | St. Pierre et al. ............. 372/22 |
| 5,936,987 A | * | 8/1999 | Ohishi et al. .......... 372/29.014 |
| 5,974,062 A | | 10/1999 | Yasuda et al. ................. 372/34 |
| 6,002,697 A | | 12/1999 | Govorkov et al. ............ 372/34 |
| 6,614,584 B1 | * | 9/2003 | Govorkov et al. .......... 359/328 |
| 2003/0147433 A1 | | 8/2003 | Kafka et al. ................... 372/22 |

FOREIGN PATENT DOCUMENTS

EP       0 503 929 A2    3/1992

* cited by examiner

*Primary Examiner*—Dung (Michael) T. Nguyen
(74) *Attorney, Agent, or Firm*—Stallman & Pollock LLP

(57) ABSTRACT

A laser system includes an optically pumped laser resonator that produces a fundamental-wavelength beam. A temperature-tuned frequency converter outside the laser resonator converts a portion of the fundamental-wavelength beam to a frequency-converted beam. The frequency converter includes at least one temperature-tuned optically nonlinear crystal. The power and position of the frequency-converted beam are dependent on the temperature of the optically nonlinear crystal and the optical pumping power. The power and position of the frequency-converted beam are monitored. The temperature of the optically nonlinear crystal is adjusted to maintain the frequency-converted beam at a predetermined position. The optical pump power is adjusted to maintain the power of the frequency-converted beam at a predetermined level.

17 Claims, 6 Drawing Sheets

STABILIZED FREQUENCY-CONVERTED LASER SYSTEM

TECHNICAL FIELD OF THE INVENTION

The present invention relates in general to the stabilization of the output of a laser system. The invention relates in particular to stabilizing the output of a diode-laser pumped, solid-state, externally frequency-converted laser system.

DISCUSSION OF BACKGROUND ART

High-precision laser machining applications can impose stringent performance requirements on laser systems. Laser drilling of the numerous small via-holes commonly incorporated in multi-layer printed circuit boards to provide inter-layer connections exemplifies such an application. Accurate placement and consistent dimensions of the laser-drilled holes must be maintained throughout a production cycle that may include many thousands or even millions of nominally identical holes. Consequently, to be considered suitable for via-drilling, a laser system should exhibit near-constant time-averaged output power and steady beam pointing during extended periods of operation. A diode-pumped solid-state (DPSS) laser can be especially attractive in this regard, but may still be problematic.

Effective laser machining of the materials commonly employed in the manufacture of printed circuit boards generally favors the use of short optical wavelengths, typically in the ultraviolet (UV) or deep-ultraviolet (DUV) portions of the electromagnetic spectrum. UV and DUV wavelengths tend to be more strongly absorbed than longer wavelengths, supporting rapid drilling rates. Short optical wavelengths are also advantageous when small focal spots are required, important for obtaining superior precision and high energy density. However, since DPSS lasers generally include gain media that most efficiently generate infrared (IR) rather than shorter wavelengths of light, a variety of techniques have been developed and widely adopted to efficiently convert DPSS laser outputs from the IR to the visible and even to UV or DUV wavelengths.

A process termed second harmonic generation (SHG) is routinely used to double the frequency and halve the wavelength of near-IR fundamental radiation having a wavelength near 1000 nanometers (nm) to produce visible light having a wavelength near 500 nm. In this context, SHG commonly involves propagating an IR output beam from a DPSS laser resonator through an appropriate optically nonlinear crystal, for example a crystal of lithium triborate (LBO). When such a crystal is properly tuned by establishing an appropriate orientation and temperature, visible light is generated and exits the crystal, usually accompanied by some residual fundamental-wavelength light. The efficiency of converting power from the fundamental wavelength to the desired frequency-converted wavelength (conversion efficiency) is defined by the ratio of the net power transferred to the frequency-converted output divided by the power contained in the fundamental-wavelength source beam. IR-to-visible conversion efficiencies exceeding 50% in LBO are readily demonstrated.

To extend this conversion process to an even shorter wavelength, a second optically nonlinear crystal can be configured to mix the visible SHG output from a first crystal with the residual IR-wavelength light to generate the third harmonic of the fundamental. For a fundamental wavelength of 1064 nm, a preferred operating wavelength for DPSS lasers including neodymium-doped yttrium aluminum garnet (Nd:YAG) or neodymium-doped yttrium orthovanadate (Nd:YVO$_4$) gain media, this third harmonic generation (THG) process yields a UV wavelength of 355 nm.

Alternatively, a second frequency-doubling stage may instead be arranged to act upon the SHG output alone to generate yet another and even shorter wavelength. This process is termed fourth harmonic generation (FHG) since the second-stage frequency-converted output has an optical frequency four times greater than that of the fundamental IR radiation. For the 1064 nm fundamental wavelength case cited above, FHG yields a frequency-converted DUV wavelength of 266 nm.

As noted above, optimization of a frequency converter generally involves establishing an appropriate wavelength-dependent crystal orientation and operating temperature. Operating parameters that optimize conversion efficiency for a particular frequency converter may be determined during a preliminary characterization or calibration phase of system operation. Optimal operating parameters might be determined once and thereafter be left unchanged in anticipation of retaining the demonstrated performance without subsequent intervention by a system operator.

Such an optimistic approach typically encounters problems. Over time, the frequency-converted output power of a DPSS laser, even given constant input power, tends to degrade as optical components age and accumulate damage. In addition, as the laser system power level or operating duty factor change, re-tuning of the frequency converter often becomes necessary and some method of monitoring conversion efficiency becomes advisable.

One method to compensate for deteriorating frequency-converted output power involves monitoring the frequency-converted output power level and increasing pump power as needed to boost the output while also monitoring the fundamental power level to allow determination of the conversion efficiency. Adjustments may then be made to the frequency converter to maintain or recover the desired efficiency. This approach does not always give satisfactory results.

The time-averaged power and perhaps even the position of the frequency-converted output may change so much over time that no reasonable adjustment of the diode drive current alone can recover the desired operating condition. Further, when fundamental and frequency-converted beams are sampled and detected separately, components exposed to the different beams may degrade at different rates. Such differential aging may bias the assessment of conversion efficiency. In addition, verifying that peak conversion efficiency is being maintained, when the output power may be slowly varying due to changes in the laser resonator, necessitates detuning the frequency converter away from an optimal condition, checking for a corresponding roll-off in performance, then re-tuning back to the optimal value. Another concern is that in a laser system exhibiting substantial short-term power fluctuations, such as those associated with intermittent pulsed operation, power monitoring may give erratic or misleading results due to transient thermal effects.

It would therefore be desirable to develop an alternative method of optimizing the conversion efficiency of a laser frequency converter. Ideally such an alternative method would be capable of establishing and verifying an optimal operating condition without requiring detuning, and would be less sensitive to intermittent average power fluctuations or power cycling. Such a method could then be used to improve the long-term power stability and reliability of a frequency-converted laser system.

SUMMARY OF THE INVENTION

The present invention is directed to providing a stabilized frequency-converted laser system. In a general aspect, the inventive laser system comprises a laser resonator including a gain medium, a pump system arranged to deliver optical pump power to the gain medium and thereby cause the laser resonator to generate and deliver a beam of fundamental radiation having a first (fundamental) wavelength. The laser system includes a frequency converter which can be located either inside or outside the laser resonator. The frequency converter converts a portion of the fundamental-wavelength beam to a frequency-converted beam. One or more detectors are provided for monitoring the power and position of the frequency-converted beam. A controller is arranged cooperative with the detectors to adjust the frequency converter and the pump system, stabilizing the frequency-converted output. The frequency converter includes a temperature-tuned optically nonlinear crystal. The position of the frequency-converted beam and the conversion efficiency of the frequency converter are dependent on the temperature of the optically nonlinear crystal. The temperature of the optically nonlinear crystal is adjusted to maintain the frequency-converted beam at a predetermined position. The optical pump power is adjusted to maintain the power of the frequency-converted beam at a predetermined level.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
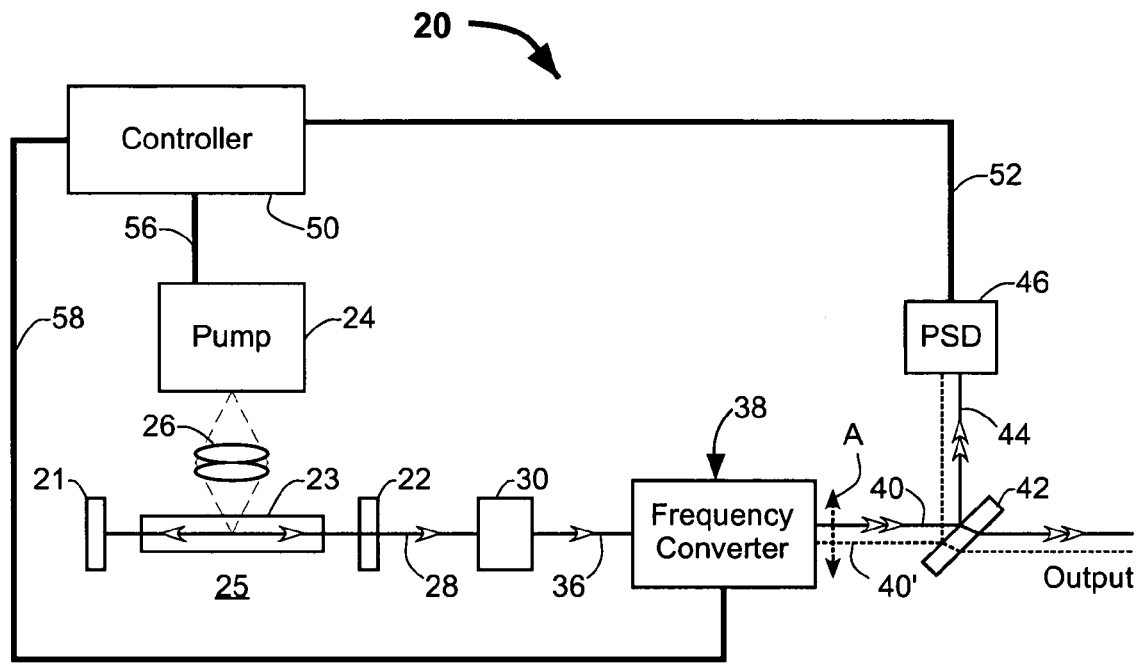
FIG. 1 schematically illustrates a preferred embodiment of a frequency-converted laser system in accordance with the present invention, having an optical position sensing detector (PSD) arranged to monitor the position and power of a frequency-converted output beam generated by a temperature-tuned frequency converter external to a laser resonator, the PSD being connected with a controller arranged to adjust a pump system energizing a gain medium within the laser resonator and arranged to adjust the frequency converter, thereby affecting the output beam power and position.

Referring now to the drawings, wherein like features are designated by like reference numerals, FIG. 1 schematically illustrates one preferred embodiment 20 of a frequency-converted laser system in accordance with the present invention. Laser system 20 includes a laser resonator 25 formed between mirrors 21 and 22. Laser resonator 25 includes a gain medium 23 energized by a pump system 24. Pump system 24 is arranged in optical communication with the gain medium 23 through a pump delivery apparatus 26. In response to the energizing of the gain medium, laser resonator 25 generates and delivers a fundamental beam 28 having a fundamental wavelength.

Pump delivery apparatus 26 is depicted in FIG. 1, for convenience of illustration, as supplying energy to gain medium 23 from the side of the fundamental beam-path (side-pumping). Side-pumping should not be considered as limiting the present invention since pump light can also be delivered predominantly along the axis of propagation of fundamental beam 28 (end-pumping).

Fundamental radiation is indicated in FIG. 1 and other drawings herein by associated laser beam lines with a single arrowhead. Laser beam lines with a double arrowhead indicate frequency-doubled radiation obtained through SHG. Laser beam lines with a triple arrowhead indicate frequency-tripled radiation obtained through THG. Laser beam lines with a quadruple arrowhead indicate frequency-quadrupled radiation obtained through FHG. The orientation of arrowheads indicates direction of propagation. Signal lines are schematically illustrated with heavy lines linking boxed components.

Fundamental beam 28 may be subjected to reshaping and redirection by beam-conditioning optics 30. Beam conditioning optics 30 may include lenses, mirrors, or beam-shaping prisms if required to enhance coupling to subsequent optical components. The conditioned beam 36 becomes the fundamental-wavelength input to frequency converter 38. Frequency converter 38 generates a frequency-converted output beam 40. The power and position of frequency-converted output beam 40 changes as frequency converter 38 is tuned. Changes in beam position are depicted by arrows A and dashed line 40'.

Frequency-converted output beam 40 is sampled by an optical element 42 disposed to direct a portion 44 of the frequency-converted beam to a position sensing detector (PSD) 46. The power contained in sampled portion 44 is preferably arranged to be less than 5% of the total frequency-converted beam power.

A residual amount of fundamental-wavelength radiation may be present in output beam 40. Optical element 42 preferably samples only the desired frequency-converted output wavelength. Devices suitable for this purpose include a beam-splitter having an appropriate dichroic coating and a holographic beam sampler. A less-selective sampling element such as an uncoated beam-splitter could also be employed if wavelength discrimination is incorporated into PSD 46.

Various types of photodetectors are suitable for use as PSD 46. Examples include a segmented detector such as simple 2-element split photodiodes, and a 4-element quad cell. A non-segmented one-dimensional (1-D) or a two-dimensional (2-D) PSD may also be used. Signals 52 from PSD 46 are communicated as inputs to the controller 50 and processed therein. These signals may include not only frequency-converted beam position information in either 1-D or 2-D format but also information related to the total output power contained in frequency-converted beam 40. For a multi-element segmented detector, for example, position information can be obtained from the difference signals between adjacent detector segments while the total power is proportional to the sum of signals from the individual segments.

Controller 50 generates output signals 58 directed to frequency converter 38 and generates additional output signals 56 directed to pump system 24. Frequency converter 38 includes at least one optically nonlinear crystal responsive to controller 50. The power delivered by pump system 24 is adjusted by the controller 50 to maintain the frequency converted power at a desired value while the frequency converter is adjusted to maintain the output beam position at a desired position generally but not exclusively corresponding to the position at which the conversion efficiency is optimized.

Figure 2:
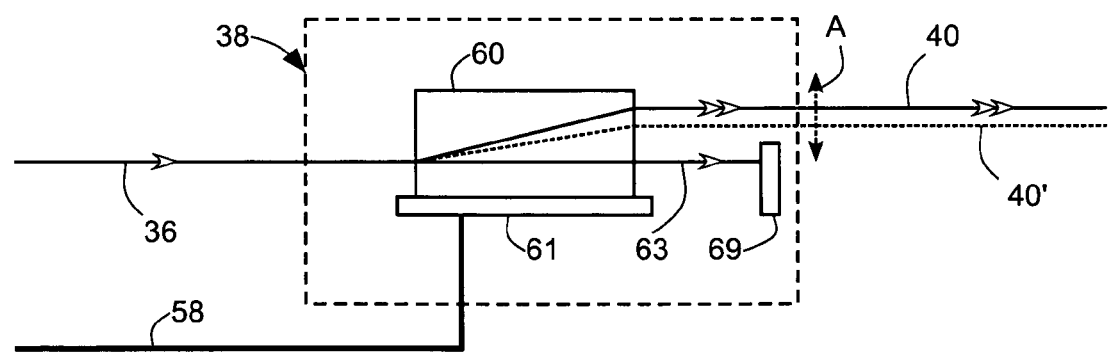
FIG. 2 schematically illustrates one example of the frequency converter of FIG. 1, including an optically nonlinear crystal in which the frequency-converted output beam exhibits temperature-dependent beam walk-off away from a fundamental-wavelength input beam.

Referring now to FIG. 2, one example of frequency converter 38 is schematically depicted. In this example, the frequency converter includes a single optically nonlinear crystal 60 arranged on the temperature-adjustable crystal holder 61. The temperature of crystal holder 61 is adjusted by signals 58 received from controller 50, as indicated in FIG. 1. The temperature of crystal 60 is thereby also adjusted through close proximity to crystal holder 61. Optically nonlinear crystal 60 in this example is configured for second harmonic generation (SHG) of fundamental-wavelength input beam 36 subject to the nonlinear optical process of critical phase matching. Beam walk-off associated with critical phase matching leads to spatial separation between frequency-converted beam 40 and residual fundamental beam 63, as shown by the diverging lines within crystal 60 and the displaced lines exiting crystal 60 corresponding to the different beam paths traced by different wavelengths. Residual fundamental beam 63 is blocked by beam stop 69.

The position of frequency-converted beam 40 depends upon the phase-matching condition established by a specific temperature of crystal 60. Dotted line 40' here indicates an alternate frequency-converted beam path corresponding to a crystal temperature different from that which is the case for the position indicated by solid line 40. As the temperature of crystal holder 61 is adjusted from the value corresponding to the position indicated by dotted line 40' to a value corresponding to the position indicated by solid line 40, the frequency-converted beam sweeps through a range of intermediate positions as indicated by arrows A.

Phase matching in birefringent optically nonlinear crystals is conventionally categorized either critical or noncritical as distinguished by the presence or absence, respectively, of double refraction. In the noncritical phase matching case, both the fundamental frequency and the converted frequency propagate collinearly along a unique crystallographic axis through a particular crystalline medium. With critical phase matching, double refraction causes the frequency-converted beam to propagate within the crystal at a slightly different angle than the fundamental-wavelength beam and eventually the two beams separate.

The magnitude of the walk-off between a fundamental wavelength beam and the frequency-converted beam generated from that fundamental beam through critical phase matching as well as the effective power transfer between the two beams depends upon the extent of phase mismatch. Therefore when a critically phase-matched nonlinear crystal is tuned, not only does the conversion efficiency change but also the walk-off angle between the fundamental frequency beam and the frequency-converted beam changes slightly. Since changes in the walk-off angle near the optimal phase-matched condition are generally small, this effect is commonly overlooked or ignored. Nonetheless, by carefully monitoring the position of a frequency-converted beam and correlating the observed beam position with the corresponding fundamental wavelength conversion efficiency, information about the phase-matching condition is obtained that is not only unambiguous but also can be more easily interpreted than repeated input and output power measurements.

In addition, for typical birefringent optically nonlinear crystals, the fundamental and frequency-converted beams remain in the same plane while the crystal is tuned in temperature through the optimal phase matching condition. This behavior simplifies the task of tracking the frequency-converted beam position by making beam walk-off one-dimensional in nature when the beam displacement is monitored within an intersecting plane orthogonal to the direction of propagation. A planar beam position sensing detector oriented to detect displacement along the appropriate projected line of beam movement provides sufficient information to allow adjustment of the crystal temperature, thereby maintaining constant conversion efficiency and fixing the frequency-converted beam position.

Figure 3:
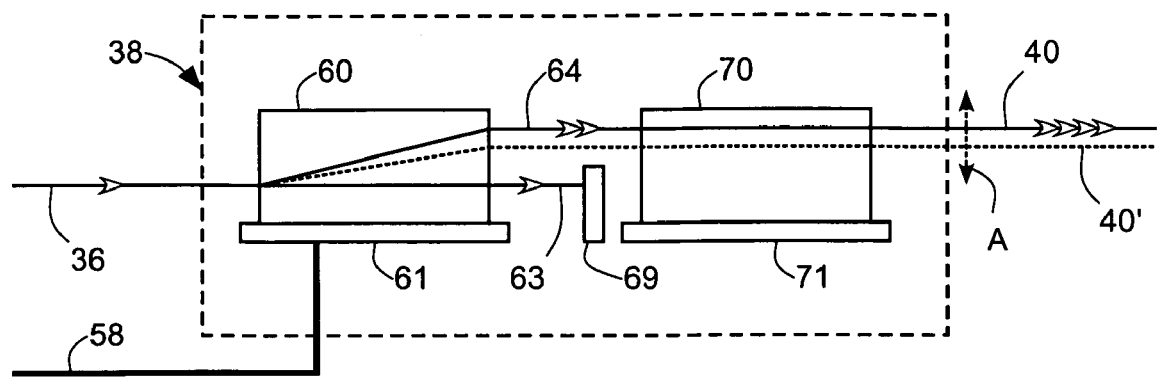
FIG. 3 schematically illustrates another example of the frequency converter of FIG. 1, including a first-stage second-harmonic generator, and a second-stage fourth-harmonic generator, with frequency-converted beam walk-off occurring in the first-stage, second-harmonic generator.

Referring now to FIG. 3, another example of frequency converter 38 including two successive stages of frequency conversion is schematically illustrated. In addition to the components indicated in FIG. 2 that here provide a first stage of frequency conversion, in FIG. 3 frequency converter 38 includes optically nonlinear crystal 70 arranged on temperature-adjustable crystal holder 71. Crystal 70 is arranged to frequency-double the first-stage frequency-converted SHG beam 64 and generate a second-stage frequency-converted beam 40 that exits frequency converter 38 as depicted by a line with a quadruple arrowhead. The change in beam position realized by temperature-tuning of first-stage crystal 60 is transmitted through second-stage crystal 70 and remains evident in frequency-converted output beam 40 as shown by dotted line 40' indicating an alternate frequency-converted output beam path.

FIG. 3 depicts an implementation of FHG in which first-stage frequency-converted beam 64 has a wavelength corresponding to the second harmonic of the fundamental that is redoubled in second-stage crystal 70 to yield the fourth harmonic of the fundamental as frequency-converted output 40. In this case the second-stage crystal does not interact with residual fundamental-wavelength beam 63 and this beam is preferably blocked by beam stop 69 before entering crystal 70 to avoid possible problems associated with unintended heating of the second-stage crystal 70 or the second-stage crystal holder 71.

Figure 4:
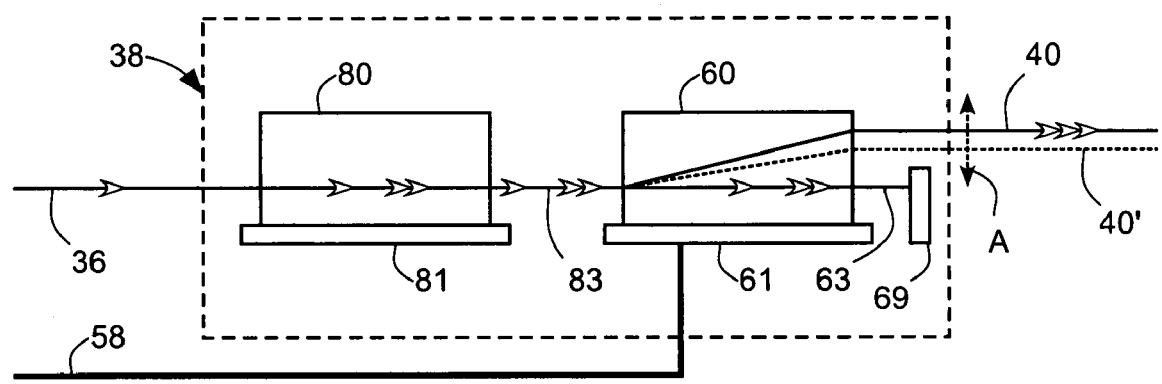
FIG. 4 schematically illustrates yet another example of the frequency converter of FIG. 1, including a first-stage second-harmonic generator and a second-stage third-harmonic generator, with frequency-converted beam walk-off occurring in the second-stage, third-harmonic generator.

Referring now to FIG. 4, yet another example of frequency converter 38 again including two stages of frequency conversion is schematically illustrated. In FIG. 4 a first-stage optically nonlinear SHG crystal 80 that does not exhibit beam walk-off is arranged on crystal holder 81. First-stage crystal 80 generates frequency-doubled radiation that remains substantially collinear with the residual fundamental radiation, as shown by line 83 with both a single and a double arrowhead indicating the common beam path for fundamental-frequency and SHG light exiting crystal 80. Second-stage optically nonlinear crystal 60 is arranged on temperature-adjustable crystal holder 61. Crystal 60 is disposed to generate a frequency-converted beam through sum-frequency mixing of the superimposed SHG and residual fundamental-wavelength radiation to yield the desired frequency-converted THG output 40 indicated by a line with a triple arrowhead. The residual fundamental and first-stage frequency-converted radiation of beam 63 is separated from the output 40 by beam walk-off in crystal 60 and is blocked by beam stop 69.

When the fundamental wavelength is near 1000 nm, the SHG crystal is preferably fabricated from LBO and configured for noncritical phase matching to maximize conversion efficiency while avoiding beam walk-off and retaining the desired spatial overlap of the unconverted fundamental and second harmonic beams. In this configuration, the preferred SHG crystal temperature would be near 150° C. The THG crystal is also preferably fabricated from LBO, but configured for critical phase matching with non-negligible beam walk-off to obtain the desired relationship between the output THG beam position and the THG crystal temperature. However, the orientation of LBO crystallographic axes required for the THG crystal is different than the orientation of the SHG crystal, and the nominal THG crystal temperature should be near 60° C. to optimize the second-stage frequency conversion.

Figure 5:
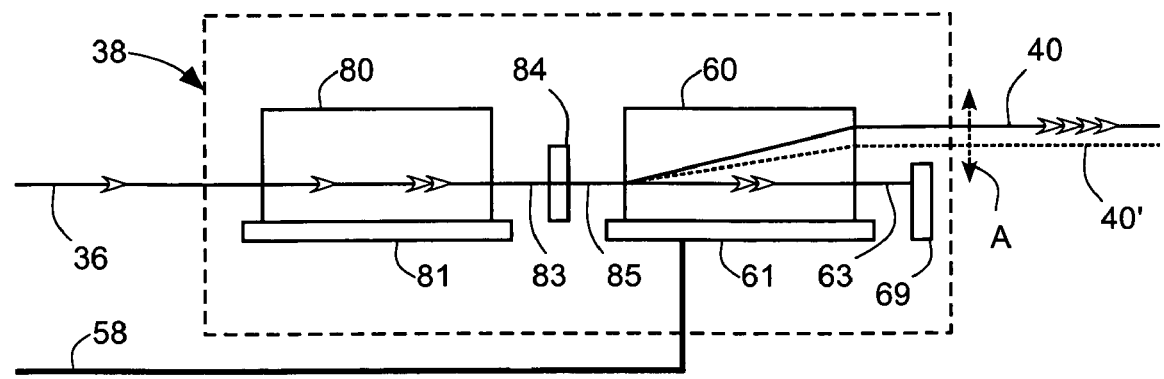
FIG. 5 schematically illustrates still another example of the frequency converter of FIG. 1, including a first-stage second-harmonic generator and a second-stage fourth-harmonic generator, with frequency-converted beam walk-off occurring in the second-stage, fourth-harmonic generator

Referring now to FIG. 5, still another example of frequency converter 38 including two stages of frequency conversion is schematically illustrated. As in FIG. 4, first-stage SHG crystal 80 generates frequency-doubled radiation that remains substantially collinear with the residual fundamental radiation. However, in this example, a filter 84 that preferably allows transmission of first-stage SHG radiation rejects the residual fundamental radiation in the first-stage output 83. The SHG radiation transmitted through filter 84 becomes the input 85 to the second-stage crystal 60 arranged on a second-stage temperature-adjustable crystal holder 61. Crystal 60 is disposed to re-double the SHG beam, thereby yielding the desired frequency-converted FHG output 40 indicated by a line with a quadruple arrowhead. The residual unconverted first-stage beam 63 is separated from the output 40 by beam walk-off and is blocked by beam stop 69.

If the fundamental wavelength is near 1000 nm, the SHG crystal is preferably fabricated from LBO and configured for noncritical phase matching to maximize first-stage conversion efficiency. In this case, the preferred SHG crystal temperature would be near 150° C., as is the case for the frequency converter example of FIG. 4. It should be noted that since spatial overlap between the residual fundamental radiation and the SHG beam is not necessary for FHG, an SHG crystal configured for critical phase matching could be used instead, if preferred. The FHG crystal is preferably fabricated from cesium lithium borate (CLBO). The nominal FHG crystal temperature should be substantially cooler than the SHG crystal, for example, near 60° C., to optimize frequency conversion from the second harmonic to the fourth harmonic.

Figure 6:
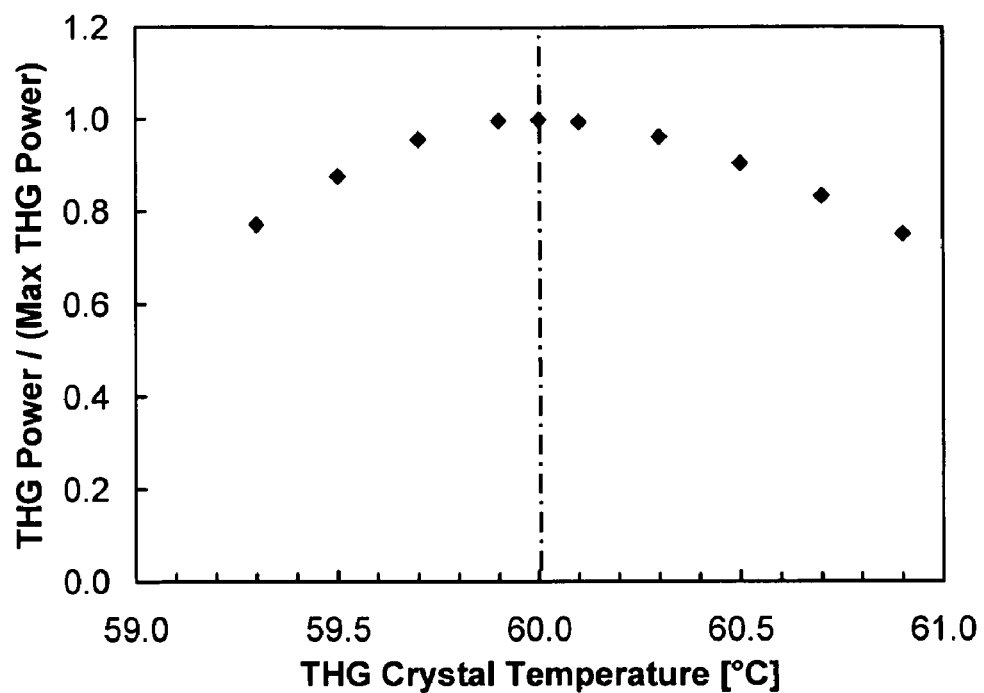
FIG. 6 is a graph schematically illustrating measurements of a relative change in mean frequency-converted power as a function of the bulk temperature of a lithium triborate (LBO) THG crystal used in the frequency converter configuration of FIG. 4.
Figure 7:
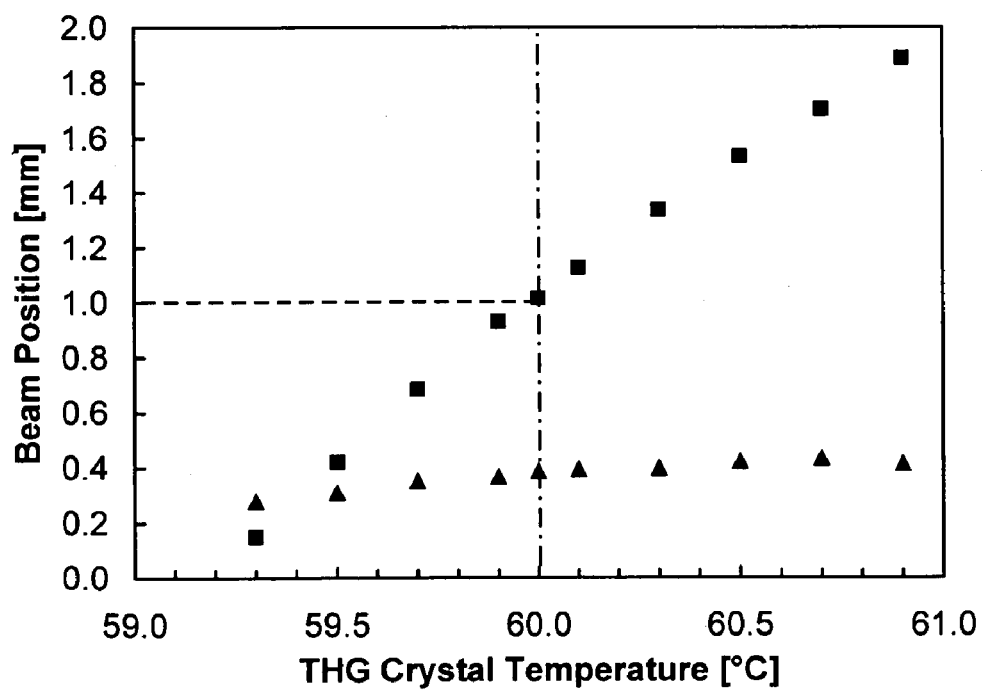
FIG. 7 is a graph schematically illustrating measurements of the output frequency-converted beam position in both horizontal (triangles) and vertical (squares) dimensions observed simultaneous to the relative power change as a function of the THG crystal temperature for the crystal of FIG. 4.

Turning now to FIGS. 6 and 7, observations of the frequency-converted output power and beam position of a THG beam generated by a laser system in accordance with the present invention are shown. The laser resonator 20 here includes a neodymium-doped yttrium orthovanadate (Nd:YVO$_4$) gain medium with a fundamental wavelength equal to 1064 nm and a corresponding THG wavelength equaling 355 nm. The frequency converter, configured as depicted in FIG. 4, includes a first-stage LBO SHG crystal and a second-stage LBO THG crystal. The plotted data points correspond to tuning of the phase-matching condition through values close to the optimal value by adjusting only the THG crystal temperature.

In FIG. 6 the measured frequency-converted output power, expressed as a fraction of the maximum output power level, is plotted as a function of the temperature of the LBO THG crystal. The reported THG crystal temperature range extends from 59.3° C. to 60.9° C. Starting from the low end of this range, THG output power is observed to increase with rising temperature by approximately 25% to a peak near 60.0° C., and thereafter decrease in a complementary fashion as temperature further increases. The peak in the frequency-converted output power plotted as a function of temperature corresponds to the optimal conversion efficiency of the THG crystal. A dot-dashed vertical line indicates the THG crystal temperature found experimentally to be associated with the peak power value.

In FIG. 7 the corresponding beam position as a function of the THG crystal temperature for the identical temperature range is provided for direct comparison with the normalized power data presented in FIG. 6. Beam displacement is reported separately for the horizontal (triangles) and the vertical (squares) values reported by a PSD oriented perpendicular to the frequency-converted beam propagating parallel to the horizontal surface of an optical table upon which the laser system is situated.

The beam position in the vertical dimension is observed to be directly proportional to the THG crystal temperature over the selected temperature tuning range, with a net displacement of the beam centroid approaching 2 millimeters (mm). The frequency-converted output beam, in this example, has a nominal diameter of 3.5 mm. This displacement represents an appreciable fraction of the beam dimension and is easily measured. Comparatively little beam movement is evident in the horizontal dimension over the same temperature range, indicating that only displacement in the vertical phase matching plane need be monitored to ascertain phase matching.

It will be evident that the frequency converter could be tuned to the optimal value of conversion efficiency simply by adjusting the THG crystal temperature to obtain a vertical beam position as reported by the PSD corresponding to the peak power location. In this example, a dashed line indicates that a vertical position value of about 1.0 mm corresponds to the displacement observed when peak conversion efficiency is obtained. It should be noted that no explicit measurement of the actual crystal temperature is required. Once the correlation between beam position and output power has been established experimentally, thereafter, adjusting the crystal temperature to bring the beam to a desired position automatically selects the corresponding conversion efficiency. All that is necessary is to establish a crystal heater drive setting that obtains the desired beam position.

In operation, the controller 50 operating in response to position signals from PSD 46 will adjust the temperature of the crystal in order to maintain the position of the beam at a location on the PSD that corresponds to the peak power condition. In addition, the controller operating in response to the power signals from the PSD will control the power delivered by the pump to the gain medium in order to maintain the output power delivered by system at the desired level.

Figure 8:
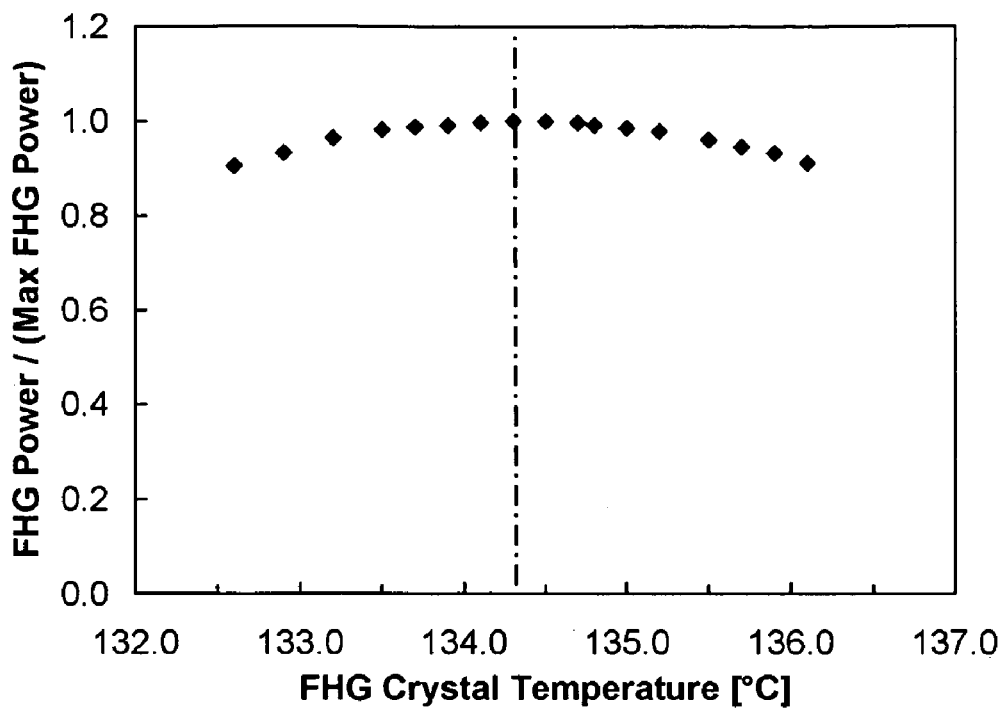
FIG. 8 is a graph schematically illustrating measurements of a relative change in mean frequency-converted power as a function of the bulk temperature of a cesium lithium borate (CLBO) FHG crystal used in the frequency converter configuration of FIG. 5.
Figure 9:
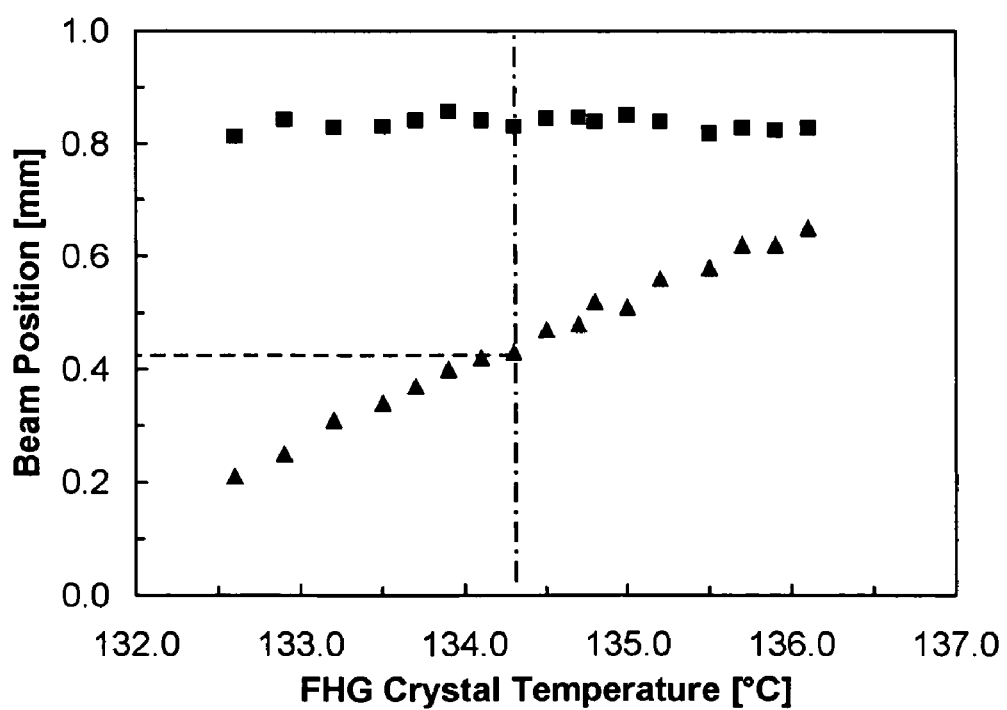
FIG. 9 is a graph schematically illustrating measurements of the output frequency-converted beam position in both horizontal (triangles) and vertical (squares) dimensions observed simultaneous to the relative power change as a function of the FHG crystal temperature for the crystal of FIG. 5.

Turning now to FIGS. 8 and 9, experimental confirmation of another example of the present invention is offered. Observations of the frequency-converted output power and beam position of an FHG beam generated by a laser system including a frequency converter in accordance with the example depicted in FIG. 5 are shown. There are some noteworthy differences in comparing this FHG demonstration to the THG example of FIGS. 6 and 7.

In FIG. 8, the measured frequency-converted output power, expressed as a fraction of the maximum output power level, is plotted as a function of the temperature of the CLBO FHG crystal. The FHG crystal temperature range extends from 132.6° C. to 136.0° C. Starting from the low end of this range, FHG output power is observed to increase with rising temperature by approximately 10% to a peak near 134.3° C., and, thereafter, decrease in a complementary fashion as temperature further increases. The peak in the frequency-converted output power plotted as a function of temperature corresponds to the optimal conversion efficiency of the FHG crystal. A dot-dashed vertical line indicates the FHG crystal temperature found experimentally to be associated with the peak power value.

In FIG. 9 the corresponding beam position as a function of the FHG crystal temperature for the same temperature values is provided for direct comparison with FIG. 8. Using the convention of FIG. 7, beam displacement is indicated separately for the horizontal (triangles) and the vertical (squares) values. The beam position in the horizontal dimension is observed to increase monotonically with increasing FHG crystal temperature, with a net displacement approaching 0.4 millimeters over the temperature range considered. However, in the vertical dimension comparatively little beam movement is observed over the same temperature range.

It should be noted that the FHG output power as indicated in FIG. 8 is comparatively less sensitive to changes in temperature than the THG power level plotted in FIG. 6, but a similar peaking behavior is still observed. Further, the optimal phase matching temperature for FHG in CLBO is substantially different than is the case for THG in LBO. Another difference evident in FIG. 9 is that the temperature-sensitive dimension for FHG is the horizontal rather than the vertical. This difference is consistent with the phase matching plane for FHG in CLBO being oriented horizontally rather than vertically, as was the case for THG in LBO. In this example, a dashed line indicates that a horizontal position value of about 0.4 mm corresponds to the beam displacement observed when the FHG conversion efficiency peaked.

These experimental observations indicate the general applicability of the inventive method for optimizing the phase matching of different optically nonlinear crystals and different frequency-converted wavelengths. There is a real benefit in being able to optimize a frequency converter without recourse to either detuning to verify peaking, or needing to specify and monitor a specific, fixed temperature. Detuning can cause power and position changes that may be problematic for an end-user, while the apparent optimum temperature may change as crystal degradation accumulates over time and leads to increased optical absorption and associated self-heating.

Figure 10:
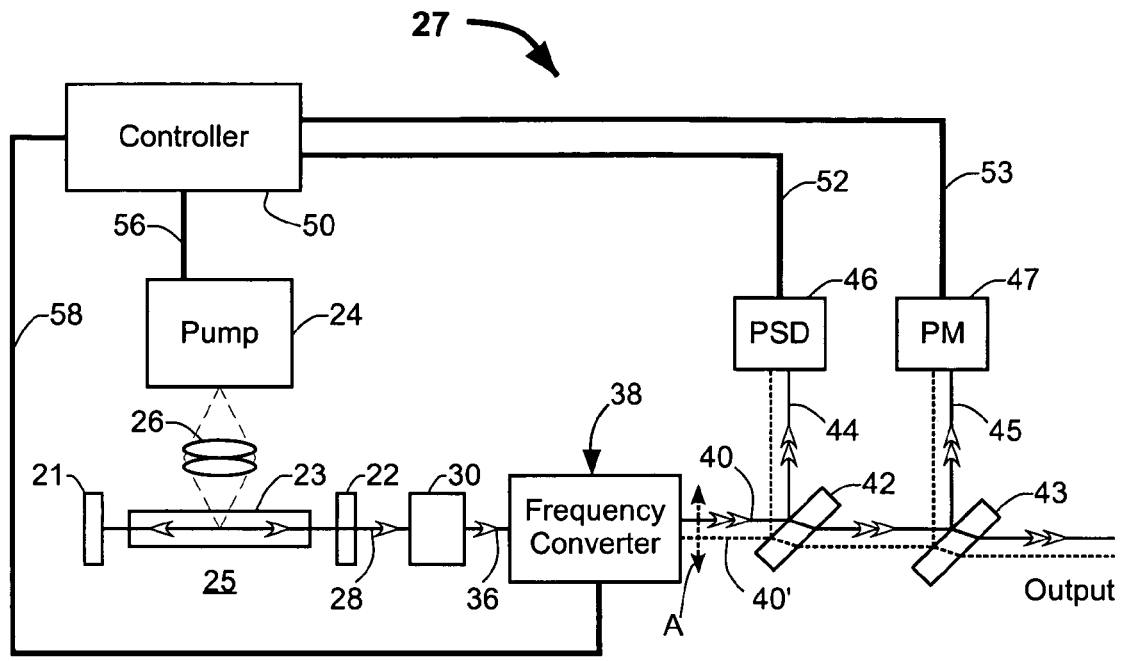
FIG. 10 schematically illustrates another preferred embodiment of a frequency-converted laser system in accordance with the present invention similar to the system of FIG. 1, but wherein a power monitor (PM) monitors the power of a frequency-converted output beam and a position sensing detector (PSD) monitors the position of a frequency-converted output beam, the PM and the PSD communicating with a controller arranged to adjust a pump system energizing a gain medium within the laser resonator.

Referring now to FIG. 10, another embodiment 27 of a frequency-converted laser in accordance with the present invention is schematically depicted. Laser system 27 is similar to above described laser system 20, with the exception that the frequency-converted output 40 power and position are determined separately.

The frequency-converted output 40 is sampled by an optical element 43 disposed to direct a portion 45 of the frequency-converted beam to a power monitor (PM) 47. PM output signals 53 representative of the power contained in the sampled frequency-converted beam 45 are communicated from PM 34 to system controller 50.

Laser system 27 provides separate monitoring of frequency-converted beam power and position. This reduces the signal acquisition capability required of a PSD, since position-dependent signals alone are required to be supplied by the PSD to the system controller. PSDs without power monitoring capabilities may be less expensive and more readily obtained than those able to simultaneously measure incident beam power and position. In addition, with separate detectors it is possible to separately optimize the power monitoring and position-sensing capabilities. This could improve the sensitivity of each measurement and provide better system performance.

Figure 11:
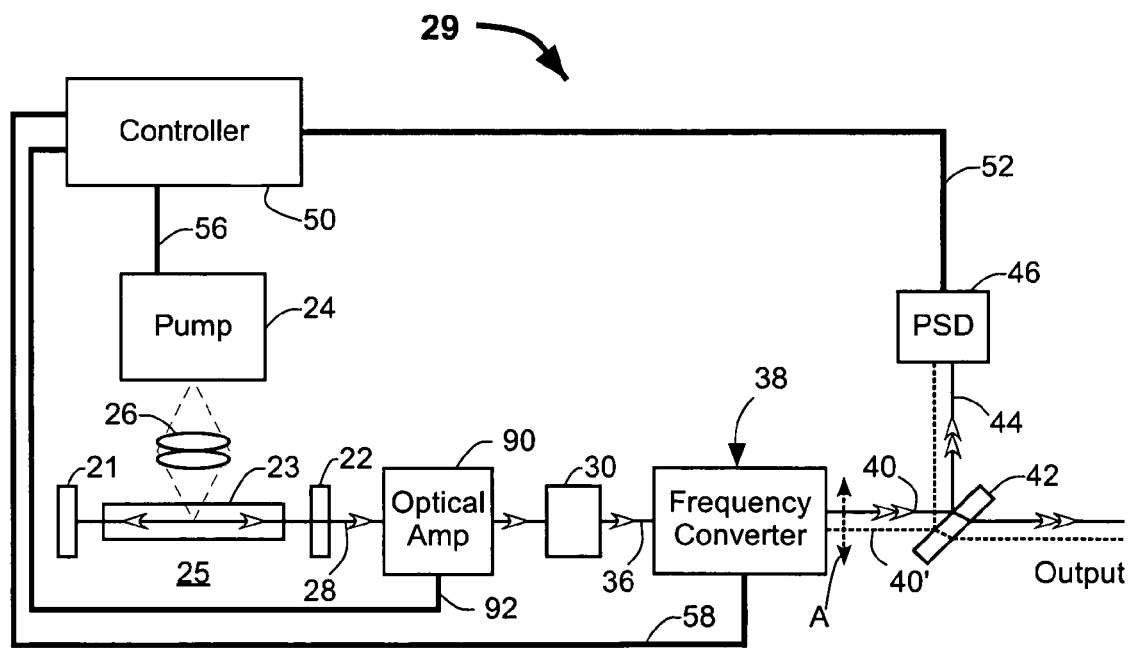
FIG. 11 schematically illustrates yet another preferred embodiment of a frequency-converted laser system in accordance with the present invention similar to the system of FIG. 1, but wherein an optical amplifier is arranged to boost the power of a fundamental-wavelength beam generated and delivered by a laser resonator prior to frequency conversion.

Referring now to FIG. 11, yet another embodiment 29 of the frequency-converted laser in accordance with the present invention is schematically depicted. Laser system 29 is similar to above described laser system 20, with the exception that an optical power amplifier 90 is arranged to boost the fundamental output 28 of laser resonator 25 while communicating with controller 50 through dedicated signals 92. Optical amplifier 90 enables laser system 29 to generate higher frequency-converted output power levels.

Figure 12:
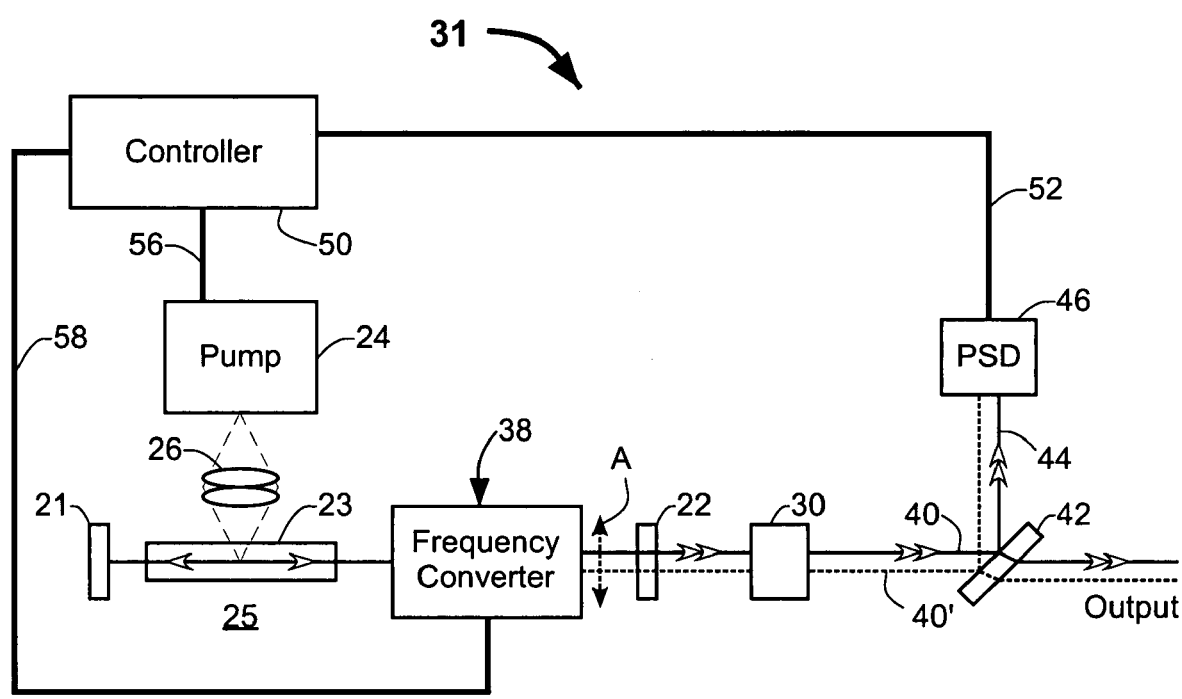
FIG. 12 schematically illustrates still another preferred embodiment of a frequency-converted laser system in accordance with the present invention similar to the system of FIG. 1, but wherein a frequency converter is positioned within the laser resonator.

Referring now to FIG. 12, still another embodiment 31 of the frequency-converted laser in accordance with the present invention is schematically depicted. Laser system 31 is similar to above described laser system 20, with the exception that frequency converter 38 is positioned within laser resonator 25 between gain medium 23 and mirror 22. While it is believed that better performance can be achieved with the frequency converter located outside the resonator, the principles of the subject invention are applicable to both configurations.

The present invention is described above in terms of a preferred and other embodiments. The present invention is not limited, however, to the embodiments described and depicted. Rather, the present invention is limited only by the claims appended hereto.

What is claimed is:

1. A laser system, comprising:
   a laser resonator including a gain medium;
   a pump system arranged to deliver optical pump power to said gain medium and thereby cause said laser resonator to generate and deliver fundamental radiation having a first wavelength;
   a frequency converter including a temperature-tuned first optically nonlinear crystal, said frequency converter arranged to convert said fundamental laser radiation delivered by said laser resonator to a beam of frequency-converted radiation having a second wavelength, the position of said frequency-converted beam and the efficiency of conversion from said first wavelength to said second wavelength being dependent on the temperature of said temperature-tuned first optically nonlinear crystal, and the power in said frequency-converted beam being dependent on the pump power delivered to said gain medium by said pump system;
   a detector arranged to provide signals representative of the position and the power of said frequency-converted beam; and,
   a controller cooperative with said pump system and said frequency converter and arranged to receive said signals from said detector, and further arranged, responsive to said signals, to adjust the temperature of said first optically nonlinear crystal to maintain said frequency-converted beam position at a predetermined position, and to adjust the pump power delivered to said gain medium by said pump system to maintain said frequency-converted power at a predetermined level.

2. The system of claim 1, wherein the detector includes a first optical element arranged to sample a first portion of said frequency-converted beam and direct said first portion to a position sensing detector, said position sensing detector arranged to provide said signals representative of said beam position and power.

3. The system of claim 2, wherein said first optical element is a dichroic beamsplitter.

4. The system of claim 2, wherein said first optical element is a holographic beam sampler.

5. The system of claim 1, wherein the detector includes a first optical element arranged to sample a first portion of said frequency-converted beam and direct said first portion to a position sensing detector, said position sensing detector arranged to provide at least one said signal representative of said beam position, and wherein the detector further includes a second optical element arranged to sample a second portion of said frequency-converted beam and direct said second portion to a power monitor, said power monitor arranged to provide at least one said signal representative of said beam power.

6. The system of claim 1, wherein said frequency-converted beam is a beam of second-harmonic radiation, and said first optically nonlinear crystal is arranged to convert said fundamental radiation delivered by said laser resonator to said second-harmonic radiation.

7. The system of claim 1, wherein said frequency-converted beam is a beam of fourth-harmonic radiation, and said first optically nonlinear crystal is arranged to convert said fundamental radiation delivered by said laser resonator to second-harmonic radiation and said frequency converter includes a second optically nonlinear crystal arranged to convert said second-harmonic radiation to said fourth-harmonic radiation.

8. The system of claim 1, wherein said frequency-converted beam is a beam of third-harmonic radiation, and said frequency converter includes a second optically nonlinear crystal arranged to convert said fundamental radiation to second-harmonic radiation and said first optically nonlinear crystal is arranged to mix said fundamental radiation with said second-harmonic radiation to generate said third-harmonic radiation.

9. The system of claim 8, wherein said first optically nonlinear crystal is an LBO crystal.

10. The system of claim 1, wherein said frequency-converted beam is a beam of fourth-harmonic radiation and said frequency converter includes a second optically nonlinear crystal arranged to convert said fundamental radiation to second-harmonic radiation and said first optically nonlinear crystal is arranged to frequency-double said second-harmonic radiation to generate said fourth-harmonic radiation.

11. The system of claim 10, wherein said first optically nonlinear crystal is a CLBO crystal.

12. The system of claim 1, further including an optical amplifier positioned between the laser resonator and the frequency converter.

13. The system of claim 1, wherein the frequency converter is located outside the resonator.

14. The system of claim 1, wherein the frequency converter is located inside the resonator.

15. A method of operating a frequency-converted laser system, the system including a laser resonator enclosing a gain medium, a pump system arranged to deliver optical pump power to the gain medium and thereby cause the laser resonator to generate and deliver fundamental radiation having a first wavelength, a frequency converter including a temperature-tuned first optically nonlinear crystal, the frequency converter located outside said laser resonator and arranged to convert the fundamental laser radiation delivered by said laser resonator to a beam of frequency-converted radiation having a second wavelength, the position of the frequency-converted beam and the efficiency of conversion from the first wavelength to the second wavelength being dependent on the temperature of the temperature-tuned first optically nonlinear crystal, and the power in said frequency-converted beam being dependent on the pump power delivered to the gain medium by the pump system, the method comprising the steps of:
   monitoring the position and power of said frequency-converted beam;
   adjusting the temperature of said optically nonlinear crystal to maintain said beam position at a position representative of optimal frequency conversion efficiency; and
   adjusting the power delivered by said pump system to said gain medium to maintain the frequency-converted output power at a desired level.

16. The method of claim 14, wherein the position and power of said frequency-converted beam are monitored by a position sensing detector.

17. The method of claim 14, wherein the position of said frequency-converted beam is monitored by a position sensing detector and the power of said frequency-converted beam is monitored by a power monitor.

* * * * *